United States Patent
Morris et al.

(10) Patent No.: US 6,505,296 B2
(45) Date of Patent: *Jan. 7, 2003

(54) EMULATED BRANCH EFFECTED BY TRAMPOLINE MECHANISM

(75) Inventors: Dale C. Morris, Menlo Park, CA (US); Jonathan K. Ross, Woodinville, WA (US); James O. Hays, San Jose, CA (US); Jerome C. Huck, Palo Alto, CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/521,160

(22) Filed: Mar. 8, 2000

(65) Prior Publication Data

US 2002/0010851 A1 Jan. 24, 2002

Related U.S. Application Data

(63) Continuation-in-part of application No. 09/168,040, filed on Oct. 7, 1998, which is a continuation-in-part of application No. 08/953,836, filed on Oct. 13, 1997, now abandoned.

(51) Int. Cl.⁷ .................................................. G06F 9/42
(52) U.S. Cl. ........................ 712/244; 710/261; 710/269
(58) Field of Search .......................... 712/244; 710/261, 710/269

(56) References Cited

U.S. PATENT DOCUMENTS

| 5,421,022 A | 5/1995 | McKeen et al. |
| 5,438,677 A | 8/1995 | Adams et al. |
| 5,535,397 A * | 7/1996 | Durante et al. ............. 710/267 |
| 5,625,835 A * | 4/1997 | Ebcioglu et al. ............... 712/23 |
| 5,634,023 A | 5/1997 | Adler et al. |
| 5,694,577 A | 12/1997 | Kiyohara et al. |
| 5,778,219 A | 7/1998 | Amerson et al. |
| 5,794,029 A | 8/1998 | Babaian et al. |
| 5,799,179 A | 8/1998 | Ebcioglu et al. |
| 5,903,749 A | 5/1999 | Kenner et al. |
| 5,915,117 A | 6/1999 | Ross et al. |

FOREIGN PATENT DOCUMENTS

| EP | 0568842 A2 | 11/1993 |
| EP | 0742512 A2 | 11/1996 |
| WO | WO 98/00769 | 1/1998 |

OTHER PUBLICATIONS

Tekkath et al., "Hardware and Software Support for Efficient Exception Handling," *ASPLOS VI Proceedings,* ACM, pp. 110–119, Oct. 4–7, 1994.*

Pohua P. Chang et al., "Three Architectural Models for Compiler–Controlled Speculative Execution," IEEE Transactions on Computers, vol. 44, No. 4, pp. 481–494 (Apr. 1995).

David M. Gallagher et al., "Dynamic Memory Disambiguation Using the Memory Conflict Buffer," ACM Press, ASPLOS VI Proceedings, pp. 183–193 (Oct. 1994).

(List continued on next page.)

Primary Examiner—William M. Treat

(57) ABSTRACT

A computer system includes a processor for executing a program and an interruption handler from a memory. The processor includes an instruction pointer indicating a memory location of a current executing instruction. The processor executes a trampoline check instruction in the program which tests a condition and if the condition is true, causes an interruption and supplies an address displacement. The interruption handler responds to the interruption and restarts execution of the program at a restart point indicating a memory location of a special handler in the program. The restart point is a sum of the address displacement and a value of the instruction pointer at the time of the interruption. If the condition is false, normal control flow of the program is continued.

39 Claims, 8 Drawing Sheets

OTHER PUBLICATIONS

Scott A. Mahlke et al., "Sentinel Scheduling: A Model for Compiler–Controlled Speculative Execution," ACM Transactions on Computer Systems, vol. 11, No. 4, pp. 376–408 (Nov. 1993).

Scott A. Mahlke et al., "Sentinel Scheduling for VLIW and Superscalar Processors," ACM SIG Plan Notices, vol. 27, No. 9, pp 238–247 (Sep. 1992).

* cited by examiner

```
         ┌─────────────────────────┐
         │ I0:  ...                │
    A1   │ I2:  br r0, I14         │
         ├─────────────────────────┤
         │ I4:  ld r1 = [r2]       │
         │ I6:  shl r3 = r1 <<3    │
    B1   │ I8:  add r4 = r3 + r5   │
         │ I10: cmp r6 = r4 > r7   │
         │ I12: br r6, I100        │
         ├─────────────────────────┤
    C1   │ I14: ...                │
         └─────────────────────────┘
```

10

FIGURE 4
ORIGINAL CODE

```
         ┌─────────────────────────┐
         │ I0:  ...                │
         │ I4:  ld.s r1 = [r2]     │
    A1   │ I6:  shl.s r3 = r1 << 3 │
         │ I8:  add.s r4 = r3 + r5 │
         │ I2:  br r0, I14         │
         ├─────────────────────────┤
         │ I9:  chk.s r4, I4r      │
    B1   │ I10: cmp r6 = r4> r7    │
         │ I12: br r6 I14          │
         ├─────────────────────────┤
    C1   │ I14: ...                │
         └─────────────────────────┘
```

20

...
I4r: ld r1 = [r2]
I6r: shl r3 = r1 << 3
I8r: add r4 = r3 + r5
I9r: br I9

FIGURE 5
SCHEDULED CODE WITH
OUT-OF-LINE RECOVERY

```
I22:  st [r1] = r3
I24:  ld r4 = [r2]
I26:  add r5 = r4 + r6
```

30

ORIGINAL CODE

```
I24:  ld.a r4 = [r2]
I26:  add r5 = r4 + r6
I22:  st [r1] = r3
I25:  chk.a r4, I24r
```

```
I24r: ld r4 = [r2]
I26r: add r5 = r4 + r6
I23r: br I25
```

40

SCHEDULED CODE WITH
OUT-OF-LINE RECOVERY

| Advanced Load Address Table (ALAT) | | | | |
|---|---|---|---|---|
| Memory Address | Memory Access Size | Register Number | Register Type | Valid Bit |
| | | | | |
| | | | | |
| | | | | |
| | | | | |

FIGURE 10

EMULATED BRANCH EFFECTED BY TRAMPOLINE MECHANISM

CROSS-REFERENCE TO RELATES APPLICATIONS

This application is a Continuation-in-Part of U.S. patent application Ser. No. 09/168,040, filed Oct. 7, 1998, which is a Continuation-in-Part of U.S. patent application Ser. No. 08/953,836 filed on Oct. 13, 1997 now abandoned.

THE FIELD OF THE INVENTION

The present invention generally relates to the execution of instructions in computer systems and more particularly to a trampoline mechanism for effecting control flow change in a computer system to emulate a branch, such as a trampoline mechanism employed for recovery of an exception caused by advanced or speculatively executed instructions.

BACKGROUND OF THE INVENTION

Computer systems include at least one processor and memory. The memory stores program instructions, data, and an operating system. The program instructions can include a compiler for compiling application programs. The operating system controls the processor and the memory for system operations and for executing the program instructions.

A "basic block" is a contiguous set of instructions bounded by branches and/or branch targets, containing no branches or branch targets. This implies that if any instruction in a basic block is executed, all instructions in the basic block will be executed, i.e., the instructions contained within any basic block are executed on an all-or-nothing basis. The instructions within a basic block are enabled for execution when control is passed to the basic block by an earlier branch targeting the basic block ("targeting" as used here includes both explicit targeting via a taken branch as well as implicit targeting via a not taken branch). The forgoing implies that if control is passed to a basic block, then all instructions in the basic block must be executed; if control is not passed to the basic block, then no instructions in the basic block are executed.

Thus, control flow between basic blocks in computer programs is typically effected with branches. A branch typically evaluates some condition and conditionally changes control flow to a new basic block, based on the outcome of the condition.

In some cases, a branch is very unlikely to be taken, such as when the branch occurs as a result of an error condition which generally does not arise during normal program execution. For such unlikely cases, branches are still typically employed to effect control flow change to a special basic block to handle the error condition.

An alternative approach that has been employed for handling error conditions is for the error condition to cause an interruption. The interruption generally invokes a different control flow mechanism and redirects execution to a special program referred to as a generic interruption handler, which is typically part of an operating system. Typically, the generic interruption handler handles the error condition in one of two ways depending on the type of error condition.

In the first scenario, the generic interruption handler responds to the error condition and resolves the problem associated with the error condition. The program which caused the error condition is then restarted at the point where the program encountered the error. In this first scenario, the error condition is generic across programs (e.g., a translation look-aside buffer (TLB) translation miss error condition). Therefore, the resolution of the error condition is performed entirely by the generic interruption handler. The generic interruption handler resolves the error condition in the same way no matter what function the program that encountered the error condition performs.

In the second scenario, the generic interruption handler determines that the program that encountered the error condition is to handle the error condition. Typically, the program provides some information to the generic interruption handler to indicate that the program itself is to handle the error condition. In addition, the program typically indicates which portion of the program should be invoked upon an error condition. After the generic interruption handler determines that the generic interruption handler cannot deal with the error condition itself and that the program that encountered the error condition has indicated that the program is to deal with the error condition, the generic interruption handler typically builds a data structure and invokes the program's own specific handler. The data structure built by the generic interruption handler is typically very large, because the generic interruption handler does not have sufficient information to determine which data items are required to handle the error condition. The error condition is then handled by the program directly. After the program completes the handling of the error condition, the operating system is invoked again to restart the program at the point where the error was encountered. This approach for handling an error condition is referred to as a signal handler approach and the generic interruption handler is referred to as a signal handler.

In summary, when changes in control flow are effected based on conditions which are relatively infrequent and which require specialized handling (i.e., not generic handling), there are two basic approaches that have been employed to effect control flow. In the first approach, a branch is made to the specialized handler portion of the program. In the second approach, a generic signal handler which is typically part of the operating system, is invoked via an interruption to control flow and the generic signal handler builds a data structure and invokes the specialized handler portion of the program.

These two basic approaches have generally worked well for simple scalar processors. Either approach generally involves some instruction, such a conditional branch or some other instruction that causes an interruption based on a condition. In earlier computer systems, the overhead for conditional branch instructions was similar to the overhead for other instructions that cause an interruption based on a condition.

The overhead for branch instructions, however, has increased significantly with present day computer systems and is projected to increase further with future computer systems. In many computer systems, some costly branch mispreditions are avoided when programs indicate that the branch is unlikely and the processor factors this into branch prediction. Nevertheless, as computer systems become wider, the need to execute multiple branches each cycle increases. Executing multiple branches each cycle requires additional resources and/or complicates branch prediction which decreases the accuracy of the prediction. Therefore, the effective costs of a branch instruction for a relatively rare condition is increasing.

On the other hand, optimizations are now being employed to effectively treat the most-likely path of a program as a single unit. Less-likely paths of the program are treated similar to error conditions. One advantage of this optimization technique is that it permits much better scheduling of hardware resources on the most-likely program path. This kind of less-likely path "error condition" is infrequent, but not nearly as infrequent as the traditional kind of error condition handled by the signal handler approach. The signal handler approach involves a tremendous amount of overhead and is only effective when the likelihood of the error is not merely small, but miniscule.

In view of the above, there is a need for an improved mechanism for changing control flow without branches for infrequent, but not ultimately rare, situations. A computer system employing such an improved control flow change mechanism is desired to permit better code scheduling, to avoid misprediction problems, and to avoid complications resulting from multiple branches per cycle. Furthermore, there is a desire that such an improved control flow change mechanism be much faster, when invoked, than the high overhead signal handler approach, so that the improved control flow change mechanism's performance cost is not significant.

The act of executing, or specifying the execution of, an instruction before control has been passed to the instruction is called "speculation." Speculation performed by the processor at program runtime is called "dynamic speculation" while speculation specified by the compiler is called "static speculation." Dynamic speculation is known in the prior art. While the vast majority of the prior art is not based on, and does not refer to, static speculation, recently some references to static speculation have begun to surface.

Two instructions are called "independent" when one does not require the result of the other; when one instruction does require the result of the other the instructions are called "dependent." Independent instructions may be executed in parallel while dependent instructions must be executed in serial fashion. Program performance is improved by identifying independent instructions and executing as many of them in parallel as possible. Experience indicates that more independent instructions can be found by searching across multiple basic blocks than can be found by searching only within individual basic blocks. However, simultaneously executing instructions from multiple basic blocks requires speculation.

Identifying and scheduling independent instructions, and thereby increasing performance, is one of the primary tasks of compilers and processors. The trend in compiler and processor design has been to increase the scope of the search for independent instructions in each successive generation. In prior art instruction sets, an instruction that may generate an exception cannot be speculated by the compiler since, if the instruction causes an exception, the program may exhibit erroneous behavior. This restricts the useful scope of the compiler's search for independent instructions and makes it necessary for speculation to be performed at program runtime by the processor via dynamic speculation. However, dynamic speculation entails a significant amount of hardware complexity that increases exponentially with the number of basic blocks over which dynamic speculation is applied—this places a practical limit on the scope of dynamic speculation. By contrast, the scope over which the compiler can search for independent instructions is much larger—potentially the entire program. Furthermore, once the compiler has been designed to perform static speculation across a single basic block boundary, very little additional complexity is incurred by statically speculating across several basic block boundaries.

If static speculation is to be undertaken, then several problems must be solved, one of the most important of which is the handling of exceptional conditions encountered by statically speculated instructions. Since, as noted above, exceptions on speculative instructions cannot be delivered at the time of execution of the instructions, a compiler-visible mechanism is desired to defer the delivery of the exceptions until control is passed to the basic block from which the instructions were speculated (known as the "originating basic block"). Mechanisms that perform a similar function exist in the prior art for deferring and later delivering exceptions on dynamically speculated instructions. However, by definition the mechanisms are not visible to the compiler and therefore cannot be manipulated by the compiler into playing a role in compiler-directed speculation. No known method or apparatus for deferring and later delivering fatal and non-fatal exceptions on statically speculated instructions has been enabled in the prior art. Limited forms of static speculation do exist in the prior art, however: (1) the forms do not involve deferral and later recovery of exceptional conditions, and (2) the forms do not enable static speculation over the breadth and scope of the present invention.

Therefore, when undertaking static speculation, there is a need in the art for a mechanism to handle exceptions on speculative instructions such that any side effects of the speculative instructions are not visible to the programmer. Further, the mechanism should apply to as many forms of static speculation as possible.

There is also a need for a mechanism to achieve higher performance in computer systems by enabling execution of as many independent instructions in parallel as possible. This is desirable even when there is a possibility that a second instruction, as well as a calculation dependent thereon, may operate upon data that can be dependent upon the execution of a first instruction.

There is also a need for an improved mechanism in computer systems for recovery of an exception caused by advanced or speculatively executed instructions which includes an improved mechanism for effecting control flow change which does not involve branches to allow for better code scheduling, to avoid misprediction problems, and to avoid complications resulting from multiple branches per cycle. Such an improved recovery mechanism is desired which is relatively fast, when invoked, so that it improves performance of the computer system's recovery from the exception caused by advanced or speculatively executed instructions.

SUMMARY OF THE INVENTION

The present invention provides a method and a computer system including a memory and a processor. The memory stores a program and an interruption handler. The program has instructions including a trampoline check instruction and a special handler for handling an interruption. The processor executes the program and the interruption handler. The processor includes an instruction pointer indicating a memory location of a current executing instruction. The processor executes the trampoline check instruction which tests a condition and if the condition is true, causes the interruption and supplies an address displacement. The interruption handler responds to the interruption and restarts execution of the program at a restart point indicating a memory location of the special handler. The restart point is equal to a sum of the address displacement and a value of the instruction pointer at the time of the interruption.

In one embodiment, the interruption handler adds the address displacement to the value of the instruction pointer at the time of the interruption to obtain the restart point in response to the interruption. In an alternative embodiment, the processor includes hardware for adding the address displacement to the value of the instruction pointer at the time of the interruption to obtain the restart point and an interruption control register for capturing the restart point. In the alternative embodiment, the interruption handler obtains the restart point from the interruption control register in response to the interruption.

In one embodiment, the processor includes an interruption control register for capturing the address displacement. In one embodiment, the memory stores an interruption vector table including an interruption vector for supplying information related to the interruption. The interruption vector is preferably not shared with other interruptions so that the interruption handler does not require additional decoding software to determine the cause of the interruption. In one embodiment, the memory stores an operating system for controlling the processor and the memory and the interruption handler is part of the operating system.

In one embodiment, if the condition is false, normal control flow of the program is continued.

In one embodiment, the processor executes the special handler of the program to handle the interruption. After the special handler handles the interruption, the processor executes a branch instruction to branch back to a portion of the program that was executing at the time of the interruption.

In one embodiment, the program instructions further include a store instruction and a load instruction that is scheduled before the store instruction. The condition is true if the store instruction and the load instruction access a common location in the memory. In one embodiment, the program instructions further include at least one calculation instruction that is dependent on data read by the load instruction. The at least one calculation instruction is scheduled ahead of the store instruction. The special handler comprises recovery code including code for re-execution of the load instruction and the at least one calculation instruction.

In one embodiment, the program instructions further include a first instruction and a second instruction. The second instruction is scheduled ahead of the first instruction. The condition is true if the second instruction operates upon data that is dependent upon the execution of the first instruction. The special handler comprises recovery code including code for re-execution of the second instruction.

In one embodiment, the program instructions further include at least one instruction marked as speculative. The condition is true if integrity of execution of the at least one instruction marked as speculative is not verified. The special handler comprises recovery code including code for re-execution of the at least one instruction marked as speculative.

In one embodiment, the program instructions are organized in a plurality of basic blocks. Each basic block including a set of contiguous instructions. The program instructions including a first instruction that is associated with a first basic block and is capable of generating an exception during execution of the program. The first instruction is scheduled outside of the first basic block and ahead of at least one instruction that precedes the first basic block. The condition is true if the first instruction generated an exception. In one embodiment, the trampoline check instruction is scheduled within the first basic block. The special handler comprises recovery code including code for re-execution of the first instruction.

In one embodiment, the program instructions further include a first speculative instruction that is capable of experiencing an instruction exception condition during execution of the first speculative instruction. The first speculative instruction defers signaling an instruction exception when the instruction exception condition is initially detected and completes execution without signaling the instruction exception. The condition is true if the instruction exception was detected during execution of the first speculative instruction. The special handler comprises recovery code including code for re-execution of the first speculative instruction.

The computer system of the present invention includes a trampoline mechanism for changing control flow to emulate a branch instruction. The trampoline mechanism permits better code scheduling, avoids branch misprediction problems, and avoids complications resulting from multiple branches per cycle. The trampoline mechanism according to the present invention is much faster, when invoked, than the high overhead signal handler approach, so the trampoline mechanism's performance cost is not significant. Therefore, the trampoline mechanism according to the present invention is quite useful for handling conditions which are infrequently true, but are not almost never true. Moreover, the trampoline mechanism according to the present invention can be employed for recovery of an exception caused by advanced or speculatively executed instructions.

BRIEF DESCRIPTION OF THE DRAWINGS

FIG. 4 depicts an original code sequence including three basic blocks.

FIG. 5 depicts a scheduled code sequence resulting from scheduling the original code sequence of FIG. 2 using static speculation according to one embodiment of the present invention.

FIG. 10 depicts an example of an advanced load address table according to one embodiment of the present invention.

DESCRIPTION OF THE PREFERRED EMBODIMENTS

Figure 1:
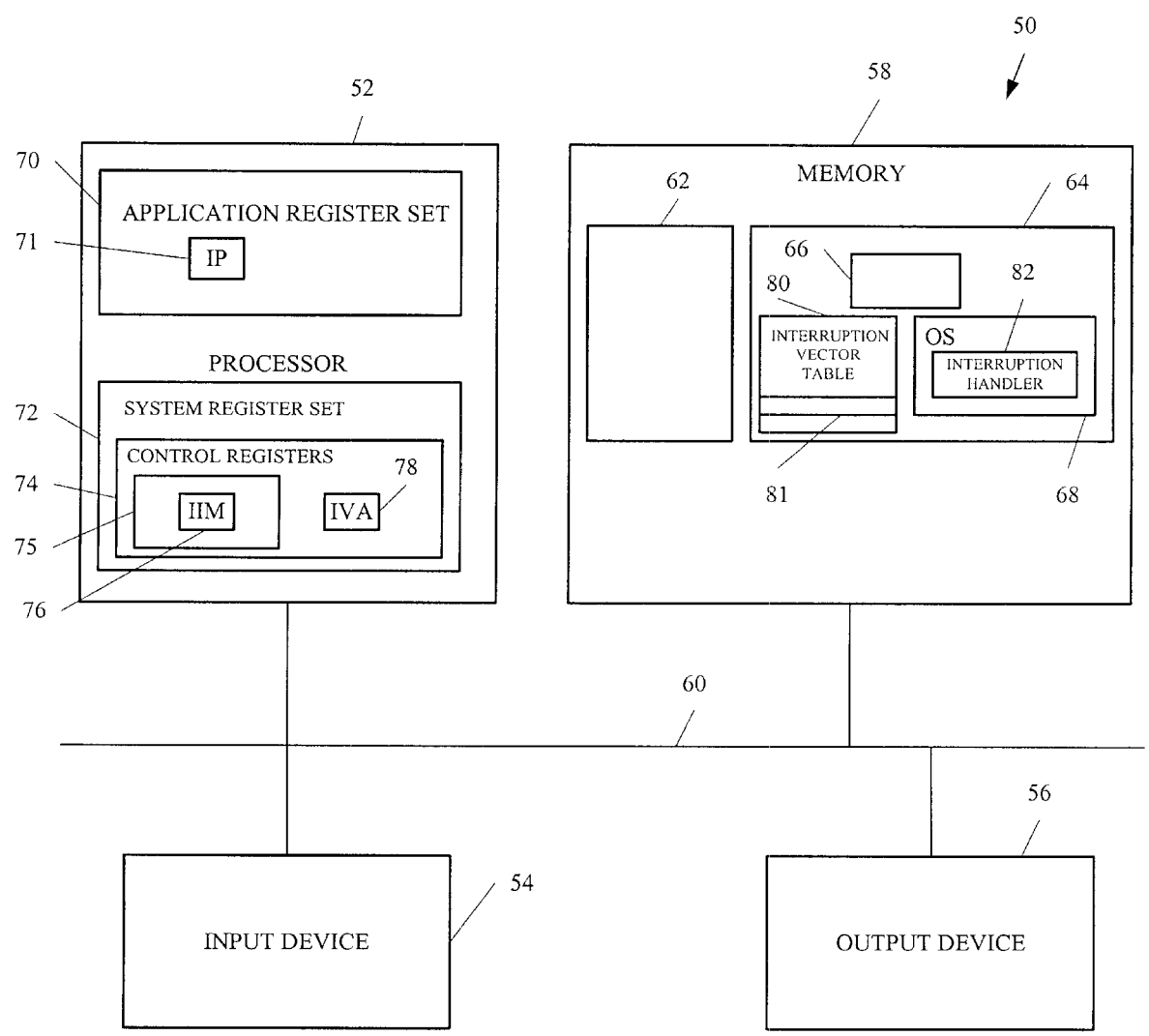
FIG. 1 is a block diagram of a general purpose computer on which embodiments of the present invention can be implemented.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment of the present invention is directed to a trampoline mechanism for effecting control flow change in a computer system to emulate a branch instruction. One embodiment of the invention is directed to a method and apparatus for allowing recovery from problems encountered during execution of advanced or speculated instructions, and in particular to a trampoline mechanism for effecting control flow change in a computer system during recovery of an exception caused by advanced or speculatively executed instructions. These aspects of the present invention can be employed with any type of computer system. An example of such a computer system is a general purpose computer system 50 illustrated in FIG. 1. General purpose computer system 50 includes a processor 52, an input device 54, an output device 56, and memory 58 connected together through a bus 60. Memory 58 includes primary memory 62 (i.e., fast volatile memory such as a dynamic semiconductor memory) and secondary memory 64 (i.e., nonvolatile memory such as flash memory and magnetic disks). Memory 58 stores one or more programs 66 executed on the processor 52. An operating system (OS) 68 is stored in memory 58 and controls processor 52 and memory 58 for system operations and for executing programs 66 stored in memory 58.

Programs 66, when executed by processor 52, control general purpose computer system 50. Programs 66 may include a compiler, the function of which is described below in connection with FIG. 6.

Processor 52 includes an application register set 70 and a system register set 72. An architectural state of computer system 50 is represented by application register set 70, system register set 72, and memory 58. Application register set 70 includes registers available to application programs stored in memory 58. System register set 72 provides system register resources for process control, interruption handling, protection, debugging, performance monitoring, and the like. System register set 72 is generally only visible to operating system 68.

Example registers which can be included in application register set 70 include general registers, floating point registers, compare result registers, branching information registers, current frame marker, process identifiers, user mask, and an application register file. Application register set 70 specifically includes an instruction pointer 71 which stores the address to the current executing instruction or the address of an instruction bundle which contains the current executing instruction.

Example registers which can be included in system register set 72 include region registers, protection key registers, debug break point registers, machine specific registers, a processor status register, and a translation look-aside buffer (TLB). System register set 72 specifically includes control registers 74 which contain several registers that capture the state of processor 52 on an interruption, enable system-wide features, and specify global processor parameters for interruptions and memory management.

Control registers 74 specifically include interruption control registers 75 which record information at the time of an interruption and are used by interruption handlers to process the given interruption. Interruption control registers 75 specifically include an interruption immediate (IIM) register 76 which captures address displacement on an interruption according to the present invention and makes the address displacement available to an interruption handler 82 in operating system 68 according to the present invention. The operation of IIM register 76 as it pertains to the trampoline mechanism for effecting control flow change in computer system 50 according to the present invention is described in detail below. Control registers 74 also specifically include an interruption vector address (IVA) register 78 which specifies the location of an interruption vector table 80 stored in memory 58 which stores interruption vectors which supply information related to corresponding interruptions.

It should be appreciated that the computer system 50 of FIG. 1 is provided merely for illustrative purposes, and that the embodiments of the present invention described below can be implemented on computer systems of numerous other types and configurations.

Computer system 50 includes a trampoline mechanism according to the present invention for effecting control flow change to emulate a branch instruction. The trampoline mechanism includes a trampoline check instruction, which is employed by computer system 50 to test a condition and cause an interruption if the condition is true. The trampoline check instruction also supplies an address displacement which specifies where to execute in the event the condition is true. In one embodiment, the trampoline check instruction is employed to effect control flow change based on conditions which are typically true for infrequent but not ultimately rare, situations.

The trampoline mechanism of computer system 50 includes an interruption vector for the given interruption condition, such as interruption vector 81 in interruption vector table 80. In one embodiment, interruption vector 81 is not shared with other interruptions so that interruption handler 82 for implementing the trampoline mechanism does not require additional decoding software to determine the cause of the interruption.

The trampoline mechanism of computer system 50 includes IIM register 76 of control registers 74 to capture the address displacement provided by the trampoline check instruction when the interruption condition is true. IIM register 76 makes the address displacement available to an interruption handler, such as interruption handler 82. In one embodiment, interruption handler 82 is part of operating system 68. Interruption handler 82 adds the address displacement stored in IIM register 76 to the value of instruction pointer 71 (i.e., program counter) at the time of the interruption to obtain a restart point. Interruption handler 82 then restarts execution at the restart point.

Figure 2:
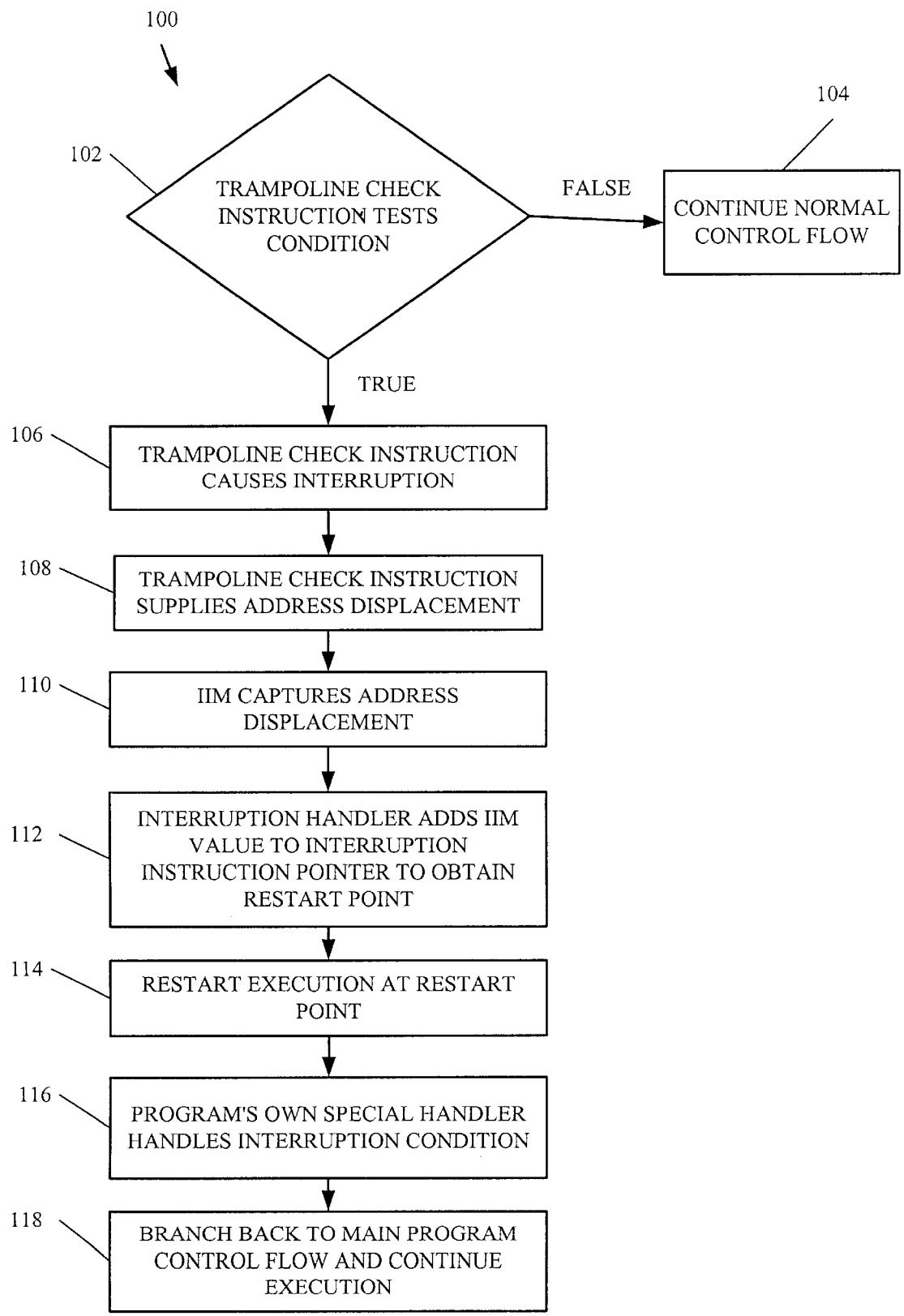
FIG. 2 is a flow diagram illustrating an operation of a trampoline mechanism for effecting control flow change according to the present invention in the computer system of FIG. 1.

One embodiment of an operation of a trampoline mechanism for effecting control flow change in computer system 50 is illustrated generally at 100 in flow diagram form in FIG. 2. At step 102, the trampoline check instruction tests whether a condition is true. If the condition is false, at step 104, normal control flow is continued. If the condition tested by the trampoline check instruction is true, at step 106, the trampoline check instruction causes an interruption. At step 108, the trampoline check instruction supplies an address displacement. At step 110, IIM register 76 captures the address displacement supplied by the trampoline check instruction in step 108.

At step 112, interruption handler 82 adds the address displacement stored in IIM register 76 to the value of instruction pointer 71 at the time of the interruption to provide a restart point. At step 114, interruption handler 82 restarts execution at the restart point calculated in step 112. In an alternative embodiment, hardware in processor 52 adds the address displacement to the value of instruction pointer 71 at the time of the interruption to obtain the restart point and an interruption control register of interruption control registers 75 captures the restart point. In this alternative embodiment, interruption handler 82 does not need to perform any calculations to obtain the restart point and simply restarts execution at the restart point captured in the interruption control register.

At step 116, the program's own special handler handles the interruption condition. After the program's own special handler handles the interruption condition, at step 11 8, a branch is made back to the main program control flow and instruction execution is continued.

Therefore, the trampoline check instruction according to the present invention effectively emulates a branch instruction from the programmer's point of view. From the hardware point of view, however, the trampoline check instruction according to the present invention simply tests a condition and interrupts if the condition is true.

Figure 3:
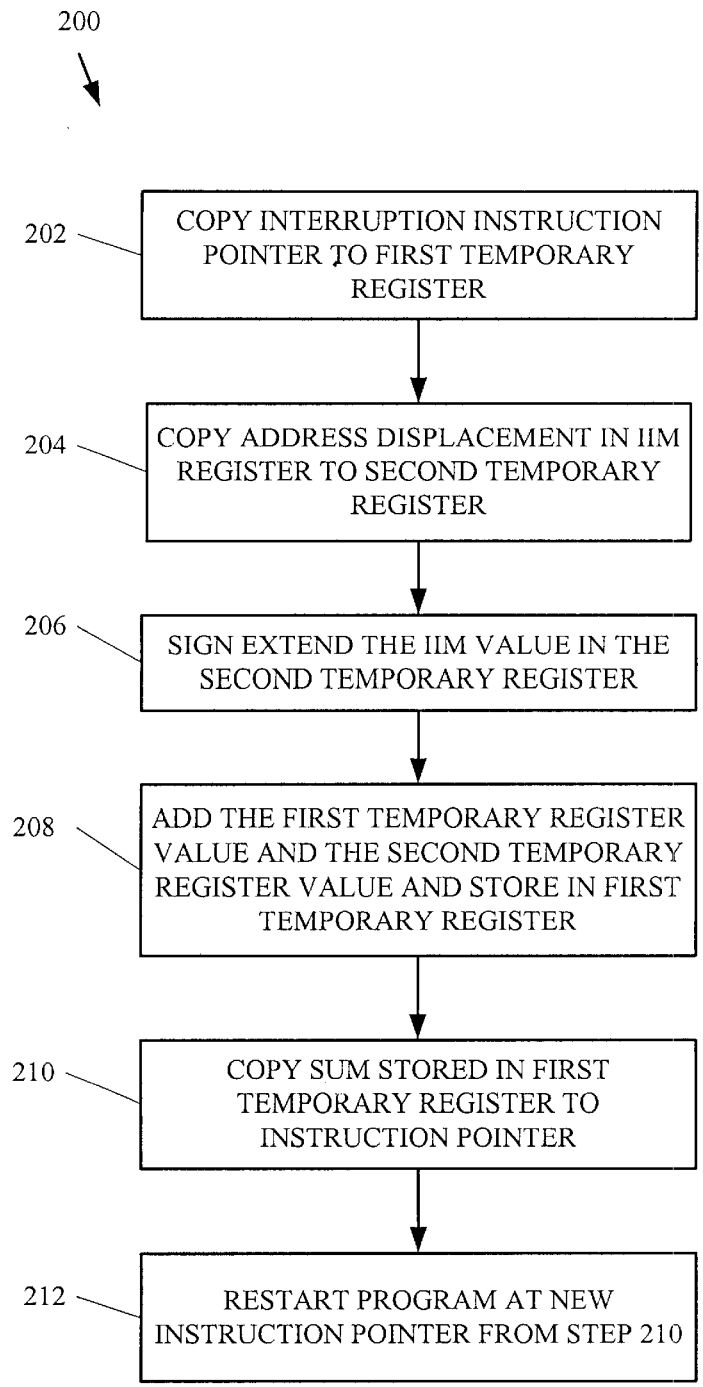
FIG. 3 is a flow diagram illustrating one embodiment of an operation of an interruption handler employed in the trampoline mechanism operation illustrated in FIG. 2.

One embodiment of an operation of interruption handler 82 for completing the semantics of the emulated branch performed by the trampoline mechanism according to the present invention is illustrated generally at 200 in flow diagram form in FIG. 3. At step 202, the value of instruction pointer 71 at the time of the interruption is copied to a first temporary register.

At step 204, the address displacement provided by the trampoline check instruction is copied to a second temporary register. In one embodiment, no special temporary registers are necessary for the interruption handler operation 200, because software convention can specify that two normal temporary registers are effectively employed by the trampoline check instruction. In another embodiment, an interruption causes a set of registers to automatically be saved for use by the interruption handler.

In one embodiment, step 206 is performed in which the IIM address displacement value stored in the second temporary register is sign extended to allow negative branch displacements. In one embodiment, the displacement is sign extended in hardware, in which case, step 206 does not need to be performed.

At step 208, the first temporary register value and the second temporary value are added together and the sum is stored in the first temporary register. In one embodiment, a shift and add instruction aligns the displacement to provide a larger displacement capability. In an alternative embodiment, displacement is delivered into the IIM register 76 aligned, in which case step 208 simply performs a normal add instruction to place the sum in the first temporary register.

At step 210, the sum stored in the first temporary register in step 208 is copied to instruction pointer 71. At step 212, the program is restarted at the new address value stored in instruction pointer 71 in step 210.

The trampoline mechanism according to the present effectively emulates a branch instruction where the overhead if the condition is false is minimal. The trampoline mechanism according to the present invention does not perform a branch, and therefore, there is no chance of a branch misprediction which results in reduced barriers to code scheduling. In addition, no branching resources are consumed by the trampoline mechanism according to the present invention, and therefore, the performance of other branches is not degraded.

Furthermore, computer system 50 must be able to detect interruptions on most instructions, so the trampoline interruption mechanism adds little complexity to the existing interruption detection and prioritization mechanisms of computer system 50. The trampoline check instruction according to the present invention allows computer system 50 to perform a large number of tests each cycle, where each test might cause a control flow change, without any extra hardware as would be required in multi-way branching.

When the trampoline check instruction condition is true, the overhead required to handle the condition is significantly less than the signal handler approach described in the Background of the Invention section of this present specification. The interruption handler 82 for implementing the trampoline mechanism does not need to discriminate between different potential causes of the interruption in the embodiment where interruption vector 81 is not shared with other interruptions. Interruption handler 82 does not attempt to perform any resolution of the interruption condition itself. Interruption handler 82 does not build any data structures, rather, the error-handling code in the program itself simply works on the data where the data is stored. In addition, unlike the conventional signal handler approach, operating system 68 does not need to be invoked to start the program back up after the interruption condition is handled. Instead, when the error handling code in the program finishes handling the interruption condition, a branch is simply performed to effect control flow change back to the main program control flow and continue execution.

The trampoline mechanism according to the present invention is quite useful in situations where the condition tested is unlikely, but not almost never. For example, this type of situation occurs with the optimization techniques currently used to effectively treat the most-likely path of a program as a single unit, and the less-likely paths as essentially error conditions. In this optimization technique, the handling of the less-likely program paths are performed with the trampoline mechanism according to the present invention with significantly less overhead than the signal handler approach when the condition is true, but without the cost to performance for the most-likely path of the program which would be caused if a normal branch instruction was used to effect control flow.

One implementation of the trampoline mechanism according to the present invention is for recovery from deferred exceptions caused by instructions that are speculatively executed or executed in advance. The method and apparatus for allowing recovery from problems encountered during execution of advanced or speculated instructions is described in detail below. As to the use of a trampoline mechanism according to the present invention for recovery from exceptions deferred by advanced or speculative instructions, the compiler stored in memory 58 generates special instructions referred to as speculative instructions which are performed early and speculatively.

The work performed by these advanced or speculative instructions can result in exceptional conditions. These exceptional conditions must not have any immediate effect, since at the point the work of the advanced or speculative instructions is performed, the work is being performed advanced or speculatively. At the point the advanced or speculative work is required, a special check instruction, described below, is used to detect whether there are any exceptional conditions. If there are any exceptional conditions, the trampoline mechanism according to the present invention invokes a special section of the program code, tailored to redo the advanced or speculatively performed work. In this case, the work is no longer speculative and any exceptions are handled immediately. When the work is redone, a branch instruction is executed to change control flow back to the main program control flow and continue execution.

One aspect of the present invention relates to a method and apparatus for recovering from problems encountered during execution of statically speculated instructions. One embodiment of the present invention relates to executing any type of instruction segment that has been scheduled by a compiler to be speculatively executed, verifying the integrity of the execution of the instructions that were speculatively executed, and executing recovery code to correct problems, if any problems are detected.

Instructions are divided into two classes: speculative and non-speculative. At the start of compilation all instructions are initialized to be non-speculative. When, during the course of scheduling, the compiler schedules an instruction outside of the instruction's originating basic block, the compiler marks the instruction as being speculative. Non-speculative instructions that encounter an exceptional condition generate an exception. Speculative instructions that encounter an exceptional condition do not generate an exception but rather write a "deferred exception token" (DET) into their destination. The existence of the exceptional condition prevents a specified computation instruction from being completed with the proper operands and therefore the destination of the instruction includes the DET rather than the correct result. A non-speculative instruction that reads a DET generates an exception. A speculative instruction that reads a DET writes another DET into the instruction's destination (note again that the destination does not contain the correct result)—this behavior is called "propagation." By placing a non-speculative instruction into the originating basic block of a particular speculative instruction, and by configuring the non-speculative instruction to read a destination of the speculative instruction (or any location into which a DET may have been propagated), a DET generated by the speculative instruction can be detected at the point at which control is passed to the originating basic block. At this point it is necessary to re-create the exceptional condition that caused the original creation of the DET, and to replace all previously propagated DET's with the correct results. This is achieved by a process called "recovery." Recovery can involve augmenting the program with additional code generated by the compiler; the code is a copy of the set of dependent speculative instructions in non-speculative form such that, upon execution, all exceptional conditions generate exceptions and all previously written destinations are overwritten with the correct results. The recovery code need not be an exact copy of the instruction sequence, but may be code that, when executed, achieves the same result. Furthermore, in one embodiment of the invention, a new instruction is defined with the specific purpose of checking for the existence of DET's and activating the associated recovery code in the event a DET is detected.

The above-discussed embodiment of the present invention does not depend on the exact form of the DET. Also, alternative embodiments for specifying speculative and non-speculative instructions are possible without affecting the scope of the present invention. For example, some instructions may be defined to behave speculatively independent of whether the instructions were scheduled outside of their originating basic block.

The speculation referred to up to this point is called "control speculation" since instructions are executed before control is passed to them. Speculation can take other forms besides control speculation. One example of this is "data speculation" whereby a mechanism is defined that allows instruction A, which may be dependent on instruction B, to be executed before instruction B. Although data speculation can apply to any class of instruction, loads and stores are discussed below to demonstrate data speculation. A load that is below a store generally cannot be scheduled above the store unless it can be shown that the address read by the load is never equal to the address written by the store. If the addresses are equal then the load should receive the results of the store. However, if it can be shown that the address read by the load is never equal to the address written by the store, then the load can be safely scheduled above the store. Data speculation occurs when the compiler schedules the load above the store when it cannot be proven that the addresses being accessed by both will never be equal. When the addresses accessed by both instructions are determined to be equal at runtime, an error condition known as a collision occurs. In the event of a collision, a recovery mechanism may be employed to correct any incorrectly written destinations. In one embodiment of the present invention, a load instruction and one or more instructions dependent thereon are scheduled by the compiler above a store instruction, even if the compiler determines there may be a collision between the two instructions. Thus, aspects of the present invention are directed to control speculation, data speculation, as well as other forms of speculation.

One aspect of the present invention provides a technique wherein a compiler may schedule instructions to be speculatively executed, yet the computer system can recover from speculation errors that occur during speculative execution of the instructions. Another aspect of the present invention is directed to a method and apparatus for advancing an instruction out of order. This includes scheduling a second instruction, as well as an entire calculation dependent thereon, (e.g., a load instruction) to be executed in advance of a first instruction (e.g., a store instruction) which may produce an error condition known as a collision, due to the first and second instructions accessing the same address in a portion of a memory.

To implement some aspects of the present invention, a computer architecture can be defined that allows a compiler to schedule instructions outside of their originating basic block (control speculation), and schedule parallel execution of instructions that may potentially access the same memory location (data speculation), and therefore are potentially dependent. One example of such a computer architecture is described in greater detail in the Ross et al., U.S. Pat. No. 5,915,117, entitled "COMPUTER ARCHITECTURE FOR THE DEFERRAL OF EXCEPTIONS ON SPECULATIVE INSTRUCTIONS" which is incorporated herein by reference. While the aspects of the present invention are described below with respect to this architecture, the present invention is not limited to use with this architecture, and may be realized using other architectural features, as will be described in greater detail below.

This new architecture defines a set of "speculative" instructions that do not immediately signal an exception when an exceptional condition occurs. Instead, a speculative instruction defers an exception by writing a "deferred exception token" (DET) into the destination specified by the instruction. The instruction set also contains "non-speculative" instructions that immediately signal an exception when an exceptional condition occurs, as is common of conventional instructions.

Instruction exceptions are well known in the art, and include, but are not limited to, exceptions such as page faults, illegal operands, privilege violations, divide-by-zero operations, overflows, and the like. The new architecture also provides a new type of memory speculation wherein a load instruction that follows a store instruction in the logical order defined by a programmer may be executed before the store instruction based on the speculation that the two instructions will not access the same memory location. A memory speculation check, which may, for example, access an advanced load address table (ALAT) that contains a record of recent speculative memory accesses, can be provided to determine if the speculation is correct. If the speculation is correct, the instructions were properly executed. If not, the load instruction, and any instructions that are dependent on the load and were scheduled above the store, are executed again to retrieve the contents written by the store instruction.

Using instructions marked as speculative, a compiler may schedule instructions outside of their originating basic block, and may schedule possibly dependent memory accesses in parallel. As stated above, when a speculative instruction generates an exception, a "deferred exception token" may be written into the destination specified by the instruction. Any speculative instruction that detects a DET in any source copies the DET into its destination. Note that when a speculative instruction finds a DET in a source, it need not perform the function associated with the instruction. The instruction can simply copy the DET to the destination. In this manner, the DET propagates through the block of speculative instructions. Thus, in one embodiment of the invention a destination which would include the result of a calculation may be checked for a DET, without checking each operand used in the calculation.

Any non-speculative instruction that detects a DET in a source may generate an immediate exception. Accordingly, DET's propagate through speculative instructions in dataflow fashion until (and if) they reach a non-speculative instruction.

If a program determines at runtime that the speculation upon which instructions were executed was incorrect (for example, a branch that was incorrectly predicted), the program may simply ignore the DET's since the DET's are not accessed by the program. However, if the speculation was correct, DET's are converted into an actual exception if, and when, the originating basic block of the instruction that created the DET is executed. In one embodiment, this conversion is performed by an instruction called the "speculation check" instruction, or "chk.s" for short. The chk.s instruction reads a source, and if the source contains a DET, branches to a specified target address that implements recovery code. Similarly, in one embodiment of the present invention the correctness of memory speculation may be determined by an "advance check" instruction, called a chk.a instruction. The chk.a instruction determines whether a memory location was accessed out-of-order, and if it was, the chk.a instruction branches to a specified target address that implements recovery code. The chk.a instruction will be discussed in greater detail below. Chk.s and chk.a may each be implemented in a number of ways which result in a change in the control flow of the instructions being executed. For example, each can be implemented as a conditional branch instruction. In one embodiment, the chk.s instruction and/or the chk.a instruction can be implemented as an instruction, such as the trampoline check instruction described above, that generates an exception that invokes an exception handler, such as interruption handler 82, to effect control flow change with a trampoline mechanism according to the present invention, such as illustrated in the flow diagrams of FIGS. 2 and 3 and described above.

By definition, the chk.s and chk.a instructions are always non-speculative. Generally, if these instructions detect a DET or an incorrect memory speculation, recovery code is executed that includes non-speculative versions of the offending instructions. With respect to a chk.s instruction that detects a DET, upon execution of the recovery code, the non-speculative version of the offending instruction will replace the DET in its destination with the correct result and/or generate the exception. If any later speculative instructions were dependent on the offending instruction, they are also included in the recovery code to be re-executed because the DET's were propagated into the later speculative instruction's destinations, and therefore these destinations may contain incorrect results. With respect to a chk.a instruction, the recovery code must re-execute the offending load instruction to load the proper contents from memory. In addition, any instructions dependent on the offending load instruction that were scheduled above the store on which the load depends are also re-executed. Scheduling of load instructions and calculation instructions dependent on the loaded value above the store instruction will be discussed further below. Any instructions not dependent on the offending instruction are not re-executed since this is not necessary and since some of them would incorrectly modify the program state if re-executed. Since the compiler scheduled the speculative instructions and the speculation checks, the compiler will be able to generate recovery code appropriate for a particular set of speculative instructions.

One aspect of the present invention may be realized by a computer system having a compiler capable of scheduling instructions for speculative execution and generating appropriate recovery code, and an architecture capable of executing instructions marked as speculative, such as a computer system that implements the architecture described above.

FIG. 4 depicts an original code sequence 10 consisting of three basic blocks A1, B1, and C1. Original code sequence 10 represents code as specified by a programmer. Within code 10, instruction I0 represents instructions coming before instruction I2. Instruction I2 is a branch instruction that branches to instruction I14 if the contents of register r0 are non-zero. Instruction I4 loads register r1 with the contents of the memory location pointed to by register r2. Instruction I6 shifts the contents of register r1 left by three bit positions, and writes the result into register r3. Instruction I8 adds the contents of registers r3 and r5, and writes the result in register r4. Instruction I10 compares the contents of register r4 with the contents of register r7. If the contents of register r4 are greater than the contents of register r7, then a non-zero value is written into register r6. Otherwise, zero is written into register r6. Instruction I12 is a branch instruction that branches to instruction I100 (not shown in FIG. 4) if the contents of register r6 are non-zero. Finally, instruction I14 represents instructions that come after instruction I12 when the branch is not taken. Within basic block B1, instruction I12 is dependent on instruction I10, which in turn is dependent on instruction I8, which in turn is dependent on instruction I6, which in turn is dependent on instruction I4.

FIG. 5 depicts a scheduled code sequence 20 resulting from scheduling original code 10 of FIG. 4 using static speculation in accordance with one illustrative embodiment of the present invention. In FIG. 5, instructions I4, I6, and I8 have been scheduled outside of their originating basic block B1 and into block A1, and have therefore been marked as speculative by the compiler (indicated by the ".s"

modifier). Instructions I10 and I12 have not been scheduled outside of their originating basic block B1 and are not marked with an ".s" since they are not speculative.

In one embodiment of the present invention, certain instructions, generally those that do not cause exceptions, always behave as if they were speculative (and, for example, propagate DET's) independent of whether or not they were scheduled outside of their originating basic block. Therefore, these instructions are not explicitly marked as speculative or non-speculative. Certain other instructions that cause exceptions, such as load instructions, may have both speculative and non-speculative varieties. Therefore, the compiler will explicitly mark these as speculative or non-speculative depending on how they are scheduled. The present invention also applies to alternative embodiments such as those where every instruction is explicitly and individually marked as speculative or non-speculative.

A sequence of dependent speculative instructions beginning with the earliest speculative instruction and ending with the latest speculative instruction, all from the same basic block, is called a "speculative dependence chain" (as used herein, "early" and "late" are defined by the original program order). In the code shown in FIGS. 4 and 5, the speculative dependence chain begins with instruction I4, includes instruction I6, and ends with instruction I8. If any instruction in the speculative dependence chain encounters an exceptional condition, then a DET will be written into the offending instruction's destination and will propagate down the speculative dependence chain. For example, if instruction I4 encounters an exceptional condition, such as a page fault, a DET will be written into register r1. Instruction I6, upon reading a DET from register r1, will in turn write a DET into register r3. Likewise, instruction I8, upon reading a DET in register r3, will in turn write a DET into register r4. Note that in this example, instruction I6 need not perform the shift function specified by the shl.s instruction, and instruction I8 need not perform the add function specified by the add.s operation. This instruction may simply propagate the deferred execution token. Accordingly, once a deferred execution token is generated, execution resources which would otherwise be consumed by the execution of speculative instructions may be made available to execute other instructions or may remain dormant thus reducing power dissipation.

At instruction I2, register r0 is evaluated. If register r0 is non-zero, execution branches to instruction I14, in which case the value stored in register r4 is not required since instructions I4, I6, and I8 were executed based on an incorrect speculation, and any exception generated by instructions I4, I6, or I8 may be ignored. Since the compiler knows that instruction I14 and the instructions that follow will only be executed if instructions I4, I6, and I8 should not have been executed, instruction I14 and the instructions that follow can simply ignore the results placed in registers r1, r3, and r4 and reuse these registers for other purposes. It is the responsibility of the compiler to generate code that properly addresses the effects of instructions that were speculatively executed because of an incorrect speculation.

However, if register r0 is zero, then the results of instructions I4, I6, and I8 are validated. During scheduling by the compiler, at the time the first instruction is made speculative from a particular basic block (instruction I4 in this example), a chk.s instruction (instruction I9 in FIG. 5) is emitted by the compiler and placed in that basic block (BI in this example). As noted earlier, the chk.s is non-speculative and is not scheduled outside of the basic block into which it is placed. The chk.s at instruction I9 reads register r4, which is the destination register of instruction I8. Instruction I9 verifies the results of all instructions in the speculative dependence chain above, including the instructions whose destination is read by the instruction I9, which are instructions I4, I6, and I8.

If a DET was not generated by the execution of instructions I4, I6, and I8, then instructions I4, I6, and I8 have been validated, thereby confirming that the speculative execution of these instructions was successful. Accordingly, execution continues with instruction I10.

However, if instruction I4, I6, or I8 generated a DET, then that DET will have propagated to register r4, where instruction I9 will detect the DET. Instructions in the speculative dependence chain (instructions I4, I6, and I8) will have produced unreliable results because their destination registers will contain DET's in place of correct results. Accordingly, the chk.s instruction (I9) will detect the DET and will branch to recovery code starting at instruction I4r. Instructions I4r, I6r, and I8r are non-speculative versions of instructions I4, I6, and I8, respectively, and instruction I9r branches to instruction I9 to re-execute the chk.s instruction. While it may not always be necessary to re-execute instruction I9, there are many situations were it is good practice to do so, such as when speculative dependence chains are dependent on each other.

Since instructions I4r, I6r, and I8r are non-speculative, they will not defer exceptions. Therefore, exceptions will be generated and processed. For example, assume that instruction I4r generates a page fault. Control will pass to the exception handler responsible for addressing page faults, and the fault will be processed. For example, program execution may be halted, or a memory page may be read in from a virtual memory swap file.

As noted earlier, to preserve the correct program state, only instructions from the offending speculative dependence chain are allowed to modify the processor state during execution of the recovery code. In the example shown in FIG. 5, only instructions I4, I6, and I8 are re-executed as instructions I4r, I6r, and I8r, and the other instructions are not. This selective re-execution is achieved by making a copy of all instructions in the speculative dependence chain starting with the earliest instruction and ending with the instruction whose destination is read by the chk.s instruction. This copy is called the "recovery code", and the chk.s instruction transfers control to the recovery code in the event that the chk.s instruction encounters a DET. At the end of the recovery code the compiler emits a branch back to instruction I9. Since the recovery code is only executed if the corresponding chk.s instruction is executed, and since the chk.s is always non-speculative, all instructions in the recovery code are non-speculative. Thus, the instructions in the recovery code are converted to non-speculative versions (if necessary). In the example shown in FIG. 5, the mainline versions of instructions I4, I6, and I8 are all marked speculative, while the recovery code copies (instructions I4r, I6r, and I8r) are all marked non-speculative. The same recovery code can be targeted by multiple chk.s instructions. Furthermore, the same speculative dependence chain may have multiple recovery codes associated with it by having separate chk.s instructions branch to separate recovery code segments.

The existence of a DET indicates that an exceptional condition occurred on an instruction in a speculative dependence chain. Therefore, before any instructions are re-executed, the exceptional condition is first handled by activating the associated exception handler. One embodiment of the present invention meets this requirement automatically because the recovery code contains non-speculative copies of all relevant instructions in the speculative dependence chain, and non-speculative instructions immediately signal exceptions. Upon execution of the recovery code, the original exception will be re-generated by the offending instruction and the appropriate exception handler will be activated. After the exception handler corrects the exceptional condition, control is returned back to the recovery code, which continues executing the remainder of the instructions before returning to the mainline code.

The present invention is not dependent upon any particular DET format. In the preferred embodiment the DET simply indicates that a deferred exception exists and contains no further information. Alternative embodiments can define the DET to contain other information that may be needed by a particular exception handler, e.g. the type of exception, the address of the offending instruction, etc.

Other aspects of the present invention also provide for recovery from other types of speculation, such as data speculation. In one embodiment of the present invention, load instructions that are advanced out of turn ahead of store instructions are used to illustrate data speculation and are described in reference to FIGS. 6–8. As used herein, the references to load and store instructions respectively indicate any instructions that perform reads and writes to memory, irrespective of whether the instructions perform other functions. Load instructions typically require longer amounts of time to execute than other instructions, due to memory latency. By moving a load instruction earlier in the execution of a program, efficiency of executing instructions in a computer is improved. The load, referred to as an advanced load, allows an increase in the parallelism of activities being performed that require use of the memory.

As discussed briefly above, often a compiler cannot detect with one hundred percent certainty whether a load instruction and a store instruction will collide (i.e., access a common memory location). This presents a barrier to achieving parallelism in that it forces a more conservative instruction schedule that will not overlap the load latency, i.e., will not move a load ahead of a store with which it might collide. However, in a large percentage of these cases, the load and store instructions do not in fact collide. Thus, one embodiment of the present invention allows a load instruction and calculations dependent thereon to be executed before a potentially colliding store instruction as one means of improving parallelism of program execution in a single or multiple processor system.

Figure 6:
FIG. 6 depicts an original code sequence including a memory store instruction followed by a memory load instruction.

Consider the simple original code 30 shown in FIG. 6. Code 30 includes: instruction I22, which stores the contents of register r3 into a memory location indexed by the contents of register r1; instruction I24, which loads register r4 with the contents of the memory location indexed by the contents of register r2; and instruction I26 which adds registers r4 and r6 and writes the result into register r5. Assume that when the compiler schedules code 30, it determines that it is unlikely, but not impossible, that the contents of register r1 will be the same as the contents of register r2 when instructions I22 and I24 are executed. Further, assume that the compiler determines that it would be more efficient to schedule instructions I24 and I26 before (or in parallel with) instruction I22. With respect to scheduling instructions in parallel, it should be appreciated that even in a single processor system, the single processor will typically include multiple execution units on which multiple instructions can be executed in parallel.

Figure 7:
FIG. 7 depicts a scheduled code sequence resulting from scheduling the original code sequence of FIG. 4 using static data speculation to advance the load instruction according to one embodiment of the present invention.

FIG. 7 shows scheduled code 40, which was produced when the compiler scheduled original code 30 of FIG. 6, in accordance with one embodiment of the present invention. Code 40 includes instructions I24 and I26 scheduled before instruction I22 (the store instruction). Note that ".a" (indicating an advanced instruction) has been appended to the load instruction, indicating that this load instruction records the load address in the advanced load address table (ALAT). Instruction I25 is a chk.a instruction that checks the ALAT to determine whether the load (I24) and store (I22) instructions accessed the same memory location. If the contents of registers r1 and r2 were not equal, the instructions did not access the same memory location, and chk.a (I25) takes no action. However, if the contents of registers r1 and r2 were equal, the chk.a instruction (I25) detects a data speculation error and branches to the recovery code starting at instruction I24r. Instruction I24r re-executes the load instruction, causing the proper results to be loaded into register r4 since the load instruction is re-executed after the store instruction (I22). Instruction I26r re-executes the add instruction which writes the correct result into register r5 and instruction I23r branches back to instruction I25, which verifies that there is no data speculation error.

Figure 8:
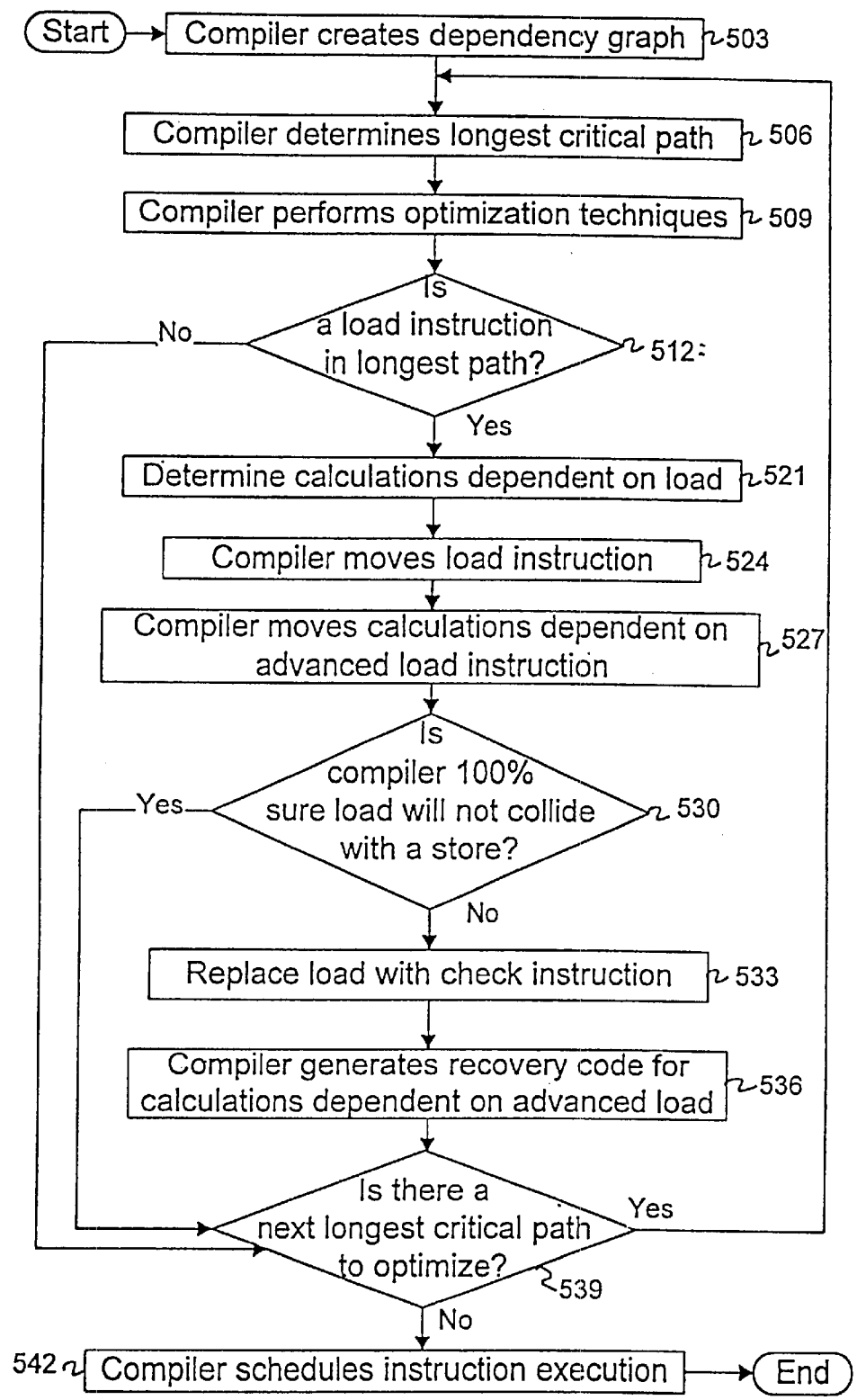
FIG. 8 is a flowchart of a process for advancing a load instruction and instructions dependent thereon ahead of a store instruction according to one embodiment of the present invention.

FIG. 8 is a flowchart illustrating one exemplary routine that may be implemented by a compiler to generate the scheduled code changes shown in FIGS. 5 and 7. This flowchart is provided merely as an example, as other implementations are possible. The present invention is not limited to use with a specific program language or computer configuration, and may be applied to a compiler used in a single or multiple processor system.

The process of FIG. 8 begins in step 503 when the compiler creates a conventional dependency graph representing instructions in a source computer program which has not yet been scheduled by the compiler. The present invention is not limited to any particular type of graph. The dependency graph may take several forms, including a diagram with at least one path representing a segment of the source computer program and a node representing each instruction in the segment of the computer program. The dependency graph for each program typically includes a plurality of paths, each with a plurality of nodes. A node representing an instruction may be annotated with information related to the instruction, such as the number of clock cycles needed to execute the instruction. Typically, arcs connecting nodes in the diagram indicate a dependency between instructions.

In step 506, the compiler reviews the graph and determines which path of the graph includes a sequence of instructions that results in a longest total execution time from start to finish.

In step 509, the compiler attempts to optimize the execution of the longest path in the program, since the longest path represents the critical portion in the program that limits the runtime of the instruction sequence. Conventional optimization techniques may be used by the compiler, and further optimization techniques are described below as they relate to an advanced load and its dependent calculations.

As mentioned above, one way the compiler can optimize the longest critical path is through data speculation. In one embodiment of the present invention, this may include moving an instruction, such as a load instruction which includes a read operation, earlier in the execution of the program before a store instruction which includes a write operation. In step 512, the compiler determines if a load instruction is in the longest critical path. If a load is included in the longest path, the compiler may advance the load and instructions dependent thereon as one method of optimization, as discussed further below.

When a load instruction is found in a path to be shortened, the compiler next determines, in step 521, which calculation instructions are dependent on the data read by the load instruction. The calculations are dependent if they require the use of the value resulting from the completion of the load instruction.

In step 524, the load instruction is removed from its place in the scheduled instruction sequence. In step 527, the calculations dependent on the load (identified in step 521) are advanced to follow the load instruction, such that both the load instruction and calculations dependent on the load instruction are advanced to allow optimization of the instruction sequence. The compiler advances the load instruction labeled "ld.a" ahead to a location wherein its execution may result in improved overall performance of the program.

As discussed above, a store instruction may exist in a path of the dependency graph ahead of the load instruction "ld.a", and the compiler may be unable to determine whether the load and store will collide (i.e., use the same memory location). In step 530, the compiler determines whether there is absolute certainty that the load and the store will not collide.

When it cannot be determined for certain that the load and the store in front of which it is moved will not collide, then in step 533, the load instruction which was removed in step 524 is replaced with a check instruction, such as a chk.a instruction described above in connection with FIGS. 5 and 6. The chk.a instruction replaces the load instruction and is performed (as described below) where the load would have been scheduled if it were not advanced.

In step 536, the compiler generates recovery code for the advanced load and the calculations dependent on the advanced load that were advanced in step 527. The recovery code will be called by the chk.a instruction, if necessary, as described below.

When a load instruction is not found in the longest critical path in step 512, or when it is determined at step 530 that the compiler is absolutely certain that the load has not been advanced in front of a store instruction with which it will collide (so that no check instruction or recovery code are necessary), or after the recovery code is generated in step 536, then the process continues at step 539, wherein the compiler determines if there is a longest critical path remaining which may potentially be optimized. The compiler may optimize each of the next longest paths in the program until the compiler optimizes as much of the source program as possible, thereby improving the parallelism of the execution of the source program.

When it is determined at step 539 that the compiler cannot further optimize the program, the process proceeds to step 542, wherein the compiler schedules the optimized instruction sequences for execution. However, when the compiler determines in step 539 that there is a longest critical path remaining which may potentially be optimized, the compiler identifies the next longest path, in step 506. In this manner, the process continues until all of the paths in the graph that can be optimized are optimized.

In step 542, the compiler schedules execution of the instructions to reflect any changes in execution order as carried out by the optimization procedures described above. The compiler may schedule execution of the instructions in the program in a number of ways, potentially making use of parallel execution units, and the present invention is not limited to any particular scheduling mechanism. For the example described above in FIG. 6, the resulting optimized code is shown in FIG. 7 and the recovery code is noted as instructions I24r, I26r and I23r.

Figure 9:
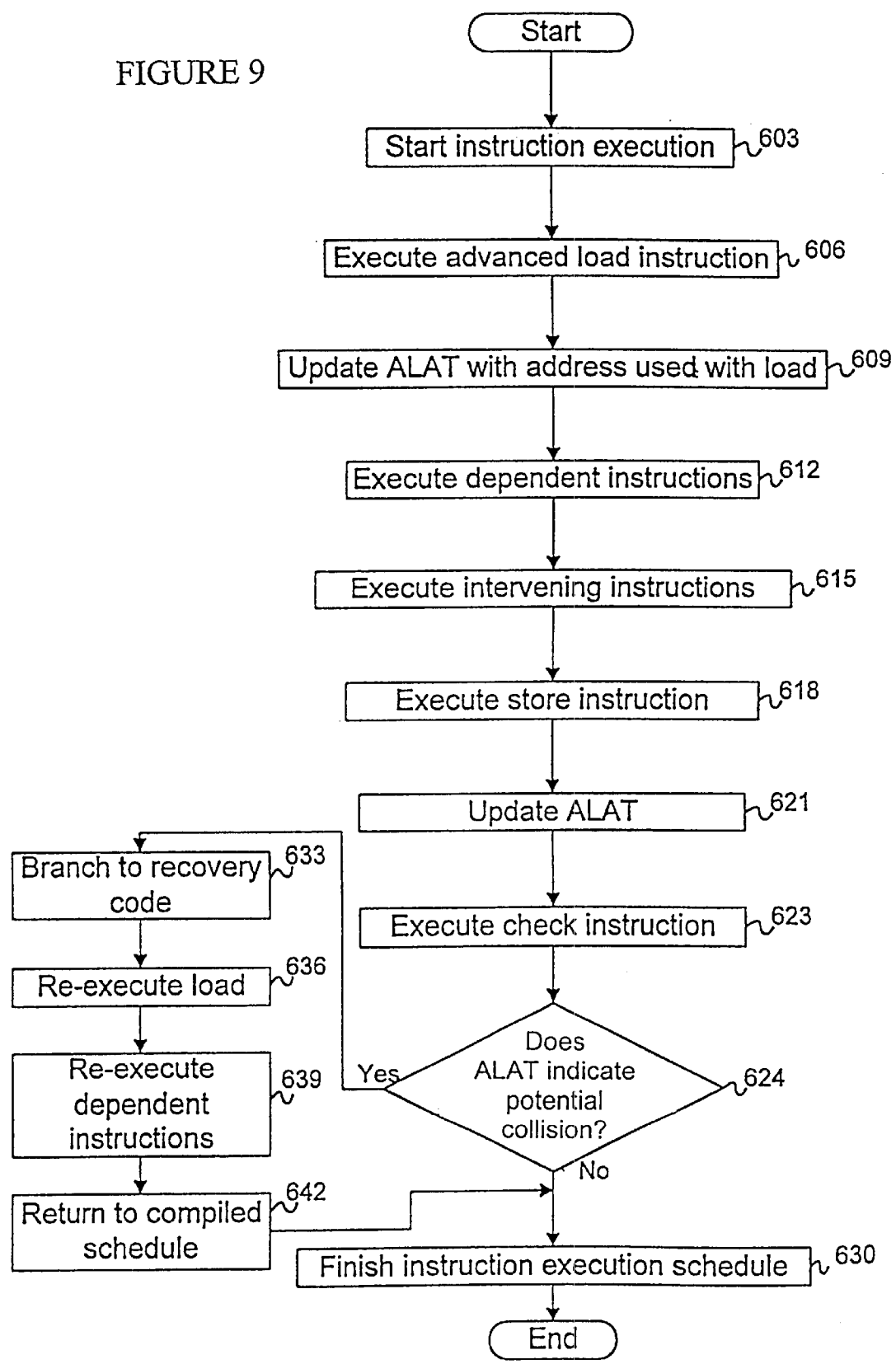
FIG. 9 depicts a flowchart of a process for executing advanced load instructions at runtime according to one embodiment of the present invention.

FIG. 9 is a flowchart illustrating a routine executed by a computer system when executing an instruction sequence optimized through techniques, such as those described above in connection with FIG. 8, that include advancing a load instruction and dependent calculations out of order ahead of a store.

Execution of the scheduled instruction sequence is started in step 603. During the execution of the instruction sequence, the advanced load (e.g., ld.a, in FIG. 7) is executed in step 606. After the advanced load instruction has been executed, the ALAT is updated to record the range of memory locations read by the advanced load instruction (e.g., the address in r2) executed in step 609. An entry is made in the ALAT to allow a later executed store instruction, such as the store executed in step 618, to determine if the advanced load and the store instructions accessed a common memory location. The present invention is not limited to any particular ALAT structure, as any structure that allows the range of memory addresses of a particular advanced load and its corresponding store instruction to be compared may be used.

In one embodiment shown in FIG. 10, an entry in the ALAT includes a physical memory address field and a memory access size field that together define the range of memory locations accessed. The present invention is not limited to this method of defining the range of memory locations, as numerous other techniques can be employed. For example, the memory range accessed may be identified by start and end memory addresses, or by a memory end address and a range. In the embodiment shown in FIG. 10, the ALAT also includes a field for a valid bit that is used to indicate whether the entry is valid. As discussed below, in one embodiment of the invention, there are times (e.g., context switches between two applications) when it is desirable to invalidate the entries in the ALAT. The valid bit provides a convenient mechanism for performing such invalidation.

In one embodiment of the invention, there can simultaneously be multiple loads that each has been advanced ahead of a corresponding store. As discussed below, during program execution a technique is provided for verifying that no collision occurred between each perror of loads and stores. Thus, in one embodiment of the invention, the ALAT includes information that uniquely identifies the advanced load instruction to which it corresponds, so that the entry can be identified to determine a possible collision with the corresponding store instruction. This unique identification can be implemented in any number of ways, and the present invention is not limited to any particular implementation. In the embodiment shown in FIG. 10, the entry for a particular advanced load is indexed based on the register number and type of register (general or floating point) used in the advanced load instruction. The register number used for each instruction is assigned by the compiler, which ensures that a unique register is used for each advanced load instruction.

When the advanced load is executed in step 606 (FIG. 9) and before an entry in the ALAT is made, the ALAT is accessed using the target register number as an index and the ALAT is checked to determine whether an entry already exists corresponding to the target register number used by the advanced load. If there is an entry, it is removed because it includes information that is not related to the present advanced load and was most likely entered during execution of an earlier advanced load. After the existing entry is cleared of the data from the previously executed advanced load, or when an empty slot corresponding to the target register number of the present advanced load is found in the ALAT, a new entry indexed by the target register number is made for the present advanced load instruction.

After the advanced load is executed and the ALAT is updated, the calculation instructions dependent on the result of the advanced load instruction (e.g., I24, I26) are executed in step 612. In the example discussed above, the dependent calculations include an add instruction I26, as shown in FIG. 7. Any other instructions that follow the advanced load instruction and that precede the store instruction above which the load was advanced are executed in step 615.

In step 618, the store instruction (e.g., I22) above which the load was advanced and with which the load may possibly collide is executed. In the example shown in FIG. 7, the store instruction I24 accesses the address in r1. In executing the store instruction I22, all of the valid entries in the ALAT are searched using the physical address and size of the region of memory being written by the store. This searching can be done in any number of ways, and the present invention is not limited to any particular technique. In one embodiment of the present invention, the ALAT is arranged as a fully associative content addressable memory so that all of the valid entries are searched simultaneously. The entries are searched to determine if a collision occurred between the store instruction and any advanced load instruction. If the range of memory space of an advanced load (e.g., I24) is found in the ALAT that overlaps the range of memory space for the store instruction, (e.g., I22), then a collision has occurred. In one embodiment of the invention, when a collision is detected, the entries in the ALAT for the addresses corresponding to the colliding advanced loads are removed in step 621, signifying the collision. In step 621, if the memory space accessed by the store instruction (e.g., I22) does not overlap with that of any advanced load instruction (e.g., I24), the entries in the ALAT corresponding to the particular advanced load instructions remain in the ALAT.

It should be appreciated that a load instruction which is advanced may be moved ahead of multiple store instructions, each of which may potentially collide with the load instruction. A single check instruction following a sequence of store instructions may be used to detect if any of the multiple store instructions collide with the load instruction since executing each store instruction includes searching all of the entries in the ALAT to determine if a collision occurred. Thus, the check instruction is independent of the number of store instructions in the program since a separate check instruction replaces each load instruction which is advanced in step 533 and each check instruction reviews the ALAT as described below in step 623.

It should also be appreciated that a collision can occur between an advanced load and a store, as discussed above, even if the starting addresses for the data accessed by those instructions are not identical. In particular, each instruction may access multiple bytes of data. Thus, a collision can occur if there is any overlap between the range of memory addresses occupied by the data read by the advanced load, and the range of memory addresses occupied by the data written by the store. The detection of a collision can be performed in numerous ways, and the present invention is not limited to any particular implementation. For example, a full range comparison can be performed between the addresses for the data written by the advanced load and read by the store. However, a full range comparison can be expensive to implement in hardware. Therefore, in accordance with one embodiment of the invention, a technique is employed for determining collisions without performing a full range comparison of the addresses for the data accessed by the advanced load and the store.

In accordance with this embodiment of the present invention, a preference is given for size-aligning data stored in memory, so that the starting address for a block of data is preferably an even multiple of its size. For example, a block of data including four bytes is preferably stored at an address wherein the two least significant bits (LSBs) are zeros, a block of eight bytes is preferably stored at an address wherein the three LSBs are zeros, etc. When the data is size-aligned, a collision can be detected by simply performing a direct equality comparison of the starting addresses for the data accessed by the advanced load and the store. It should be appreciated that a direct equality comparison is significantly less costly to implement in hardware than a full range comparison. When data is misaligned, if there is a limited amount of misalignment such that the misaligned data can fit in a larger, size-aligned data range, then in one embodiment of the invention, the hardware processes the instruction, (e.g., a load) which accesses the misaligned data as if it were accessing the larger size-aligned data range. For example, if a load accesses eight bytes of misaligned data in memory, but the data accessed by the load would fit into a size-aligned thirty-two byte range, then the load is treated as accessing thirty-two bytes of data. It should be appreciated that by treating the instruction as employing a larger block of size-aligned data, there may be situations where there is an overlap of the data addresses accessed by an advanced load and a store instruction, but not an overlap of the actual data (eight bytes in the example above) actually accessed by one of the instructions, resulting in the detection of a false collision. This performance penalty is a price paid to reduce the complexity of the hardware for detecting collisions. If data is significantly misaligned and does not fit into a reasonably large size-aligned data range, then the hardware will not process the load or store instruction. For loads, no entry is inserted into the ALAT, which causes a collision to be indicated. Although this may result in false collisions being detected, this performance penalty is a price paid to reduce the complexity of the hardware for detecting collisions. For store instructions which are significantly misaligned, the instruction may be separated into a sequence of smaller stores instructions. In one embodiment, hardware may be used to separate the larger store into the sequence of multiple stores. In another embodiment, a misaligned store which cannot fit into a size-aligned data range may cause an interrupt, and the operating system handles the store by separating the store instruction into a sequence of smaller store instructions. In both embodiments of handling a misaligned store instruction, each of the smaller stores in the sequence is checked against the valid entries in the ALAT, as described in step 618. If the range of memory space for any of the smaller stores overlaps the range of memory space of an advanced load, then a collision would be indicated as described in step 621. Thus, executing each of the smaller stores provides the same result as executing a single larger store.

In another embodiment of the present invention, a further savings in the hardware employed to detect collisions is achieved by using partial addresses for the equality comparison by ignoring one or more of the most significant bits (MSBs) of the addresses. Ignoring one or more of the MSBs results in a reduction in the size of the ALAT and in the hardware that performs the equality comparison, since fewer bits are stored in the ALAT for each entry and fewer bits are compared. For example, for a 64-bit data address, only the twenty least significant bits (LSB) of the load can be saved in the ALAT and used in the equality comparison.

It should be appreciated that ignoring one or more of the MSBs may result in the detection of some false collisions. In particular, when the ALAT is searched in executing a store instruction (e.g., in step 618), the complete starting addresses for the data of the store and the data of the load may be identical for the LSBs over which the equality comparison is performed (e.g., the twenty LSBs), but may differ for one or more of the MSBs that are ignored. When this occurs, the routine of FIG. 9 will perform as if a collision had actually occurred, e.g., by switching control flow to the recovery code. It should be appreciated that false detections will therefore result in some performance penalty due to recovering from collisions that did not in fact take place. This performance penalty is a price paid to reduce the complexity of the hardware for detecting collisions. A balance between these competing factors can be considered when determining how many (if any) MSBs to ignore in the detection scheme.

In step 623, the chk.a instruction (e.g., I25) is executed for the advanced load instruction executed in step 606. In one embodiment, the chk.a instruction reviews the ALAT to determine if a collision occurred by determining if there is an entry for the advanced load instruction (e.g., I24). Using as an index the identity of the target register and register type used by the advanced load instruction (e.g., I24) for which information was updated in the ALAT in step 621, the chk.a instruction reviews the ALAT. In step 624, if an entry is found in the ALAT corresponding to the particular advanced load replaced by the chk.a instruction, then the chk.a instruction recognizes that the store instruction (e.g., I22) and the load instruction (e.g., I24) advanced above the store did not collide. Therefore, the data read by the store instruction is valid, and the routine proceeds to finish execution of the instruction sequence in step 630.

However, if the chk.a instruction reviews the ALAT in step 624 and does not see an entry in the ALAT corresponding to the register address used by the advanced load instruction (e.g., I24), then the chk.a instruction (e.g., I25) determines that the store and advanced load instructions may have accessed the same memory space (i.e., collided). Thus, further steps are taken to ensure the accuracy of the advanced load instruction and the calculation instructions that have been executed based on the advanced load instruction (e.g., I24). In one embodiment, when a possible collision is detected, control flow of the program is changed to execute recovery code. As discussed above, this can be done numerous ways (e.g., by branching or using an exception handling technique). It should be appreciated that the ALAT can be implemented with a number of entries that may not be sufficient to support all of the advanced local instructions that may be included in a program being executed. In the embodiment shown in FIG. 9, the chk.a instruction branches to recovery code in step 633 (FIG. 9). An example of recovery code is shown in FIG. 7 as instructions I24r, I26r and I23r, which are essentially copies of comments I24, I26 and I23.

In step 636, the load instruction (e.g., I24) that was advanced in step 524 is re-executed. In step 639, instructions dependent on the advanced load instruction (e.g., I24) are re-executed. In the example of FIG. 7, the re-executed load instruction I24r and dependent add instruction I26r are shown. These instructions are re-executed after the store instruction to provide the proper results of the load instruction I24r and its dependent calculations I26r. In one embodiment, the recovery code may be any combination of instructions determined by the compiler that provides the same result as the originally executed load and dependent calculation instructions.

In step 642, the control flow returns from the recovery code back to the compiled execution schedule. This can be done, for example, using a branch instruction such as I23r in FIG. 7. Next, the execution of the scheduled instructions continues until the end of the program in step 630.

For example, in one embodiment the ALAT has space for entries corresponding to thirty-two advanced instructions. If there are more than thirty-two advanced instructions in an executed program, then the ALAT will not have enough space for information pertaining to all of the advanced instructions. When the ALAT is full and a new advanced instruction is executed, a replacement scheme can be used to take out a valid entry in the ALAT to make room for the new instruction. Furthermore, in one embodiment of the present invention, when execution at runtime switches between processes (such as between separate compiled programs), the entries in the ALAT may be saved for later restoration, or may be invalidated. Thus, in some instances, a chk.a instruction may not find an entry for a particular advanced instruction, even though a collision did not occur for that instruction.

As discussed above, the present invention is not limited to a particular ALAT structure and may include other alternative embodiments for determining whether there was a collision between a load and a store instruction. For example, other data structures or compare circuits may be used. Also, an ALAT or other structure used may vary in size and in the number of fields used. In addition, separate ALATs or data structures may be used for each of multiple register sets. For example, in one embodiment an ALAT may be used for general and floating point register sets.

While the present invention has been explained with reference to deferred exception handling and data speculation, it is not so limited. In general, the present invention encompasses any type of instruction segment that is speculatively executed, verifying the integrity of the execution of the instructions that were speculatively executed, and executing recovery code to correct any problems detected. The present invention may be extended to include an instruction that is both control and data speculative.

The transfer of control from the chk.s and chk.a instructions to the recovery code can be implemented in any of a number of ways. For example, the chk.s and chk.a instructions each may behave as a branch instruction where the address of the first instruction in the recovery code is contained in the chk.s or chk.a instruction itself (as shown in FIG. 5). Alternatively, the chk.s or chk.a instruction may generate a particular exception and the exception handler may use a value in the chk.s or chk.a instruction to identify the corresponding recovery code and then transfer control to that recovery code with a trampoline mechanism according to the present invention, such as illustrated in the flow diagrams of FIGS. 2 and 3 and described above. The exception handler may also use the address of the chk.a or chk.s instruction, which is the address location in memory where the instruction is stored, to identify the location of the recovery code. The recovery code can be based on a table created by the compiler which includes addresses of check instructions which were added by the compiler to a compiled source program. The recovery code executed is therefore identified by which check instruction is executed.

The present invention allows instructions to be advanced out of turn, even when the compiler is not certain that the instruction advanced will not collide with a later instruction. As discussed above, some conventional compilers may advance a single load instruction moved ahead of a store even if not certain that the load and store will not collide. At runtime, if there was a collision, the load instruction would be re-executed in-line in the compiled execution schedule. In contrast, in one embodiment of the present invention, optimization of instruction execution is achieved by advancing not just a load ahead of store, but also calculations dependent thereon. This enables a compiler and scheduler to most efficiently use multiple execution units at one time. Further, instead of simply re-executing the load instruction if there is a collision, a check instruction is executed which determines if there was a collision and the control flow is changed to recovery code that includes the load instruction and its dependent calculations. Thus, multiple sections of code may be executed independently and in parallel.

The present invention allows flexibility on the part of the compiler regarding the association between chk instructions, the speculative dependence chain, and the recovery code. The example contained herein is relatively simple, but much more complex code configurations are possible, such as when a speculative dependence chain consists not of a single linear sequence of instructions, as in the example shown in FIG. 7, but contains multiple sequences, or when two or more speculative dependence chains depend on each other. The present invention allows significant flexibility in addressing these various configurations, thereby allowing future refinements in the usage of recovery code as understanding of static speculation increases.

The present invention allows a wide degree of flexibility with regard to the number and configuration of chk instructions. For example, a single chk.s may be configured to read the destination of any one of the instructions along the speculative dependence chain, or multiple chk.s instructions may be emitted, with each reading a different destination. Each chk.s instruction may also invoke the same or a different set of recovery code instructions.

The present invention also encompasses alternative embodiments for detecting the presence of DET's. For example, in one embodiment, there is not an explicit chk.s instruction. Rather, DET's are detected by every non-speculative instruction as part of the normal execution of non-speculative instructions. In this embodiment, when a non-speculative instruction encounters a DET, an exception is generated that addresses the deferred exception. In another illustrative embodiment, DET's are stored in dedicated registers or memory, rather than the destinations of each instruction.

In another embodiment, the non-speculative recovery code may be the same code as the speculative in-line code. For example, an architecture may be employed wherein every instruction may be marked speculative or non-speculative based on a speculation flag contained in the instruction. For example, a compiler may schedule a segment of instructions as speculative, and a DET may be detected after these instructions have been executed, thereby activating a deferred exception handler. The deferred exception handler can simply toggle the speculation flag of the speculative instructions to convert them into non-speculative instructions, re-execute the instructions, process the exception that was previously deferred, and toggle the flags back to convert the instructions back to speculative instructions. While this embodiment provides the compiler with less flexibility in scheduling recovery code, it can also result in a substantial savings in the amount of memory consumed by the code. In addition, the speculation flag need only be toggled in cache memory, thereby minimizing the time required to toggle the speculation flags.

In a similar embodiment, a set of registers may be defined to identify code segments wherein speculative instructions should be executed as non-speculative. This embodiment would function substantially as described above, except that instead of toggling the speculation flags of the instructions to be executed non-speculatively, the registers would be loaded with indexes that identify the instructions to be executed non-speculatively.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer system comprising:
   memory storing a program, an interruption handler, and an interruption vector table, wherein the program has instructions including a trampoline check instruction and a special handler for handling an interruption, wherein the interruption vector table includes an interruption vector not shared with other interruptions for supplying information related to the interruption; and
   a processor for executing the program and the interruption handler, wherein the processor includes an instruction pointer indicating a memory location of a current executing instruction, an interruption control register, and an interruption vector address register which specifies a location of the interruption vector table in the memory, wherein the processor executes the trampoline check instruction which tests a condition and if the condition is true, causes the interruption and supplies an address displacement to the interruption control register, wherein the interruption handler responds to the interruption and restarts execution of the program at a restart point indicating a memory location of the special handler, wherein the restart point is equal to a sum of the address displacement in the interruption control register and a value of the instruction pointer at the time of the interruption.

2. The computer system of claim 1 wherein the interruption handler adds the address displacement to the value of the instruction pointer at the time of the interruption to obtain the restart point in response to the interruption.

3. The computer system of claim 1 wherein the processor includes hardware for adding the address displacement to the value of the instruction pointer at the time of the interruption to obtain the restart point and a second interruption control register for capturing the restart point, wherein the interruption handler obtains the restart point from the second interruption control register in response to the interruption.

4. The computer system of claim 1 wherein the processor executes the special handler of the program to handle the interruption.

5. The computer system of claim 4 wherein after the special handler handles the interruption, the processor executes a branch instruction to branch back to a portion of the program that was executing at the time of the interruption.

6. The computer system of claim 1 wherein if the condition is false, normal control flow of the program is continued.

7. The computer system of claim 1 wherein the memory stores an operating system for controlling the processor and the memory and wherein the interruption handler is part of the operating system.

8. The computer system of claim 1 wherein the program instructions further include:
   a store instruction;
   a load instruction that is scheduled before the store instruction; and
   wherein the condition is true if the store instruction and the load instruction access a common location in the memory.

9. The computer system of claim 8 wherein the special handler comprises recovery code including code for re-execution of the load instruction.

10. The computer system of claim 8 wherein the program instructions further include:
    at least one calculation instruction that is dependent on data read by the load instruction, the at least one calculation instruction being scheduled ahead of the store instruction.

11. The computer system of claim 10 wherein the special handler comprises recovery code including code for re-execution of the load instruction and the at least one calculation instruction.

12. The computer system of claim 1 wherein the program instructions further include a first instruction and a second instruction, wherein the second instruction is scheduled ahead of the first instruction, and wherein the condition is true if the second instruction operates upon data that is dependent upon the execution of the first instruction.

13. The computer system of claim 12 wherein the special handler comprises recovery code including code for re-execution of the second instruction.

14. The computer system of claim 1 wherein the program instructions further include at least one instruction marked as speculative, and wherein the condition is true if integrity of execution of the at least one instruction marked as speculative is not verified.

15. The computer system of claim 14 wherein the special handler comprises recovery code including code for re-execution of the at least one instruction marked as speculative.

16. The computer system of claim 1 wherein the program instructions are organized in a plurality of basic blocks, each basic block including a set of contiguous instructions, and the program instructions including,
    a first instruction that is associated with a first basic block and is capable of generating an exception during execution of the program, wherein the first instruction is scheduled outside of the first basic block and ahead of at least one instruction that precedes the first basic block; and
    wherein the condition is true if the first instruction generated an exception.

17. The computer system of claim 16 wherein the trampoline check instruction is scheduled within the first basic block.

18. The computer system of claim 16 wherein the special handler comprises recovery code including code for re-execution of the first instruction.

19. The computer system of claim 1 wherein the program instructions further include:
    a first speculative instruction tat is capable of experiencing an instruction exception condition during execution of the first speculative instruction;
    wherein the first speculative instruction defers signaling an instruction exception when the instruction exception condition is initially detected and completes execution without signaling the instruction exception;
    wherein the condition is true if the instruction exception was detected during execution of the first speculative instruction.

20. The computer system of claim 19 wherein the special handler comprises recovery code including code for re-execution of the first speculative instruction.

21. A method of executing instructions in a computer system, the method comprising:
    executing a program having instructions including a trampoline check instruction and a special handler for handling an interruption;
    executing the trampoline check instruction including:
       testing a condition; and
       if the condition is true, causing the interruption and supplying an address
    displacement to the special handler;
    capturing the address displacement in an interruption control register,
    supplying information related to the interruption with an interruption vector not shared with other interruptions and stored in an interruption vector table;
    specifying a location of the interruption vector table in the memory with an interruption vector address register; and
    executing an interruption handler in response to the interruption including:
       restarting execution of the program at a restart point indicating a memory location of the special handler, wherein the restart point is equal to a sum of the address displacement in the interruption control register and a value of an instruction pointer at the time of the interruption, wherein the instruction pointer indicates a memory location of a current executing instruction.

22. The method of claim 22 wherein the step of executing the interruption handler in response to the interruption includes:
    adding the address displacement to the value of the instruction pointer at the time of the interruption to obtain the restart point.

23. The method of claim 21 further comprising:
    adding, with hardware, the address displacement to the value of the instruction pointer at the time of the interruption to obtain the restart point;
    capturing the restart point in a second interruption control register; and
    wherein the step of executing the interruption handler in response to the interruption includes:
    obtaining the restart point from the second interruption control register.

24. The method of 21 fiber comprising the step of:
    executing the special handler of the program to handle the interruption.

25. The method of claim 24 further comprising the step of:
executing a branch instruction to branch back to a portion of the program that was executing at the time of the interruption.

26. The method of claim 21 wherein the step of executing the trampoline check instruction further includes:
if the condition is false, continuing normal control flow of the program.

27. The method of claim 21 wherein the step of executing the program further includes:
executing a store instruction;
executing a load instruction that is scheduled before the store instruction; aid
wherein the condition is true if the store instruction and the load instruction access a common location in the memory.

28. The method of claim 27 wherein the special handler comprises recovery code and executing the recovery code includes re-executing the load instruction.

29. The method of claim 27 wherein the step of executing program instructions further includes:
executing at least one calculation instruction that is dependent on data read by the load instruction, the at least one calculation instruction being scheduled ahead of the store instruction.

30. The method of claim 29 wherein the special handler comprises recovery code and execution of the recovery code includes re-executing the load instruction and the at least one calculation instruction.

31. The method of claim 21 wherein executing the program instructions further includes:
executing a first instruction and a second instruction;
wherein the second instruction is scheduled ahead of the first instruction; and
wherein the condition is true if the second instruction operates upon data that is dependent upon the execution of the first instruction.

32. The method of 31 wherein the special handler comprises recovery code and execution of the recovery code includes re-executing the second instruction.

33. The method of claim 24 wherein executing the program instructions further includes:
executing at least one instruction marked as speculative; and
wherein the condition is true if integrity of execution of the at least one instruction marked as speculative is not verified.

34. The method of claim 33 wherein the special handler comprises recovery code and execution of the recovery code includes re-executing the at least one instruction marked as speculative.

35. The method of claim 21 wherein the program instructions are organized in a plurality of basic blocks, each basic block including a set of contiguous instructions, and executing the program instructors includes:
executing a first instruction that is associated with a first basic block and is capable of generating an exception during execution of the program,
wherein the first instruction is scheduled outside of the first basic block and ahead of at least one instruction that precedes the first basic block; and
wherein the condition is true if the first instruction generated an exception.

36. The method of claim 35 wherein the trampoline check instruction is scheduled within the first basic block.

37. The method of claim 35 wherein the special handler comprises recovery code and executing the recovery code includes re-executing of the first instruction.

38. The method of claim 21 wherein executing the program instructions further includes:
executing a first speculative instruction that is capable of experiencing an instruction exception condition during execution of the first speculative instruction including:
deferring signaling an instruction exception when the instruction exception condition is initially detected; and
completing execution without signaling the instruction exception; and
wherein the condition is true if the instruction exception was detected during execution of the first speculative instruction.

39. The method of claim 38 wherein the special handler comprises recovery code and executing the recovery code includes re-executing the first speculative instruction.

* * * * *

UNITED STATES PATENT AND TRADEMARK OFFICE
CERTIFICATE OF CORRECTION

PATENT NO. : 6,505,296 B2  Page 1 of 1
DATED : January 7, 2003
INVENTOR(S) : Morris et al.

It is certified that error appears in the above-identified patent and that said Letters Patent is hereby corrected as shown below:

Title page,
Item [56], References Cited, U.S. PATENT DOCUMENTS, please insert:
-- 6,032,244  2/2000  Moudgill --; and
-- 6,145,125  11/2000  Civlin et al. --.
FOREIGN PATENT DOCUMENTS, please insert:
-- EP 605,872  7/1994  Levitan --.

Column 1,
Line 4, please delete "RELATES" and insert -- RELATED --.

Column 28,
Line 6, please delete "tat" and insert -- that --.
Line 47, please delete "22" and insert -- 21 --.
Line 65, please delete "fiber" and insert -- further --.

Column 29,
Line 14, please delete "aid" and insert -- and --.
Line 43, please delete "24" and insert -- 21 --.

Column 30,
Line 13, please delete "instructors" and insert -- instructions --.

Signed and Sealed this

Twenty-fifth Day of January, 2005

JON W. DUDAS
*Director of the United States Patent and Trademark Office*